Nov. 14, 1967    H. V. POLLOCK ET AL    3,353,006
METHOD AND DEVICE FOR DESTROYING CREDIT CARDS
Filed June 11, 1963                           2 Sheets-Sheet 1

INVENTOR.
HAROLD V. POLLOCK
JOHN M. DIEHL
BY
*John L. Diehl*
ATTORNEY

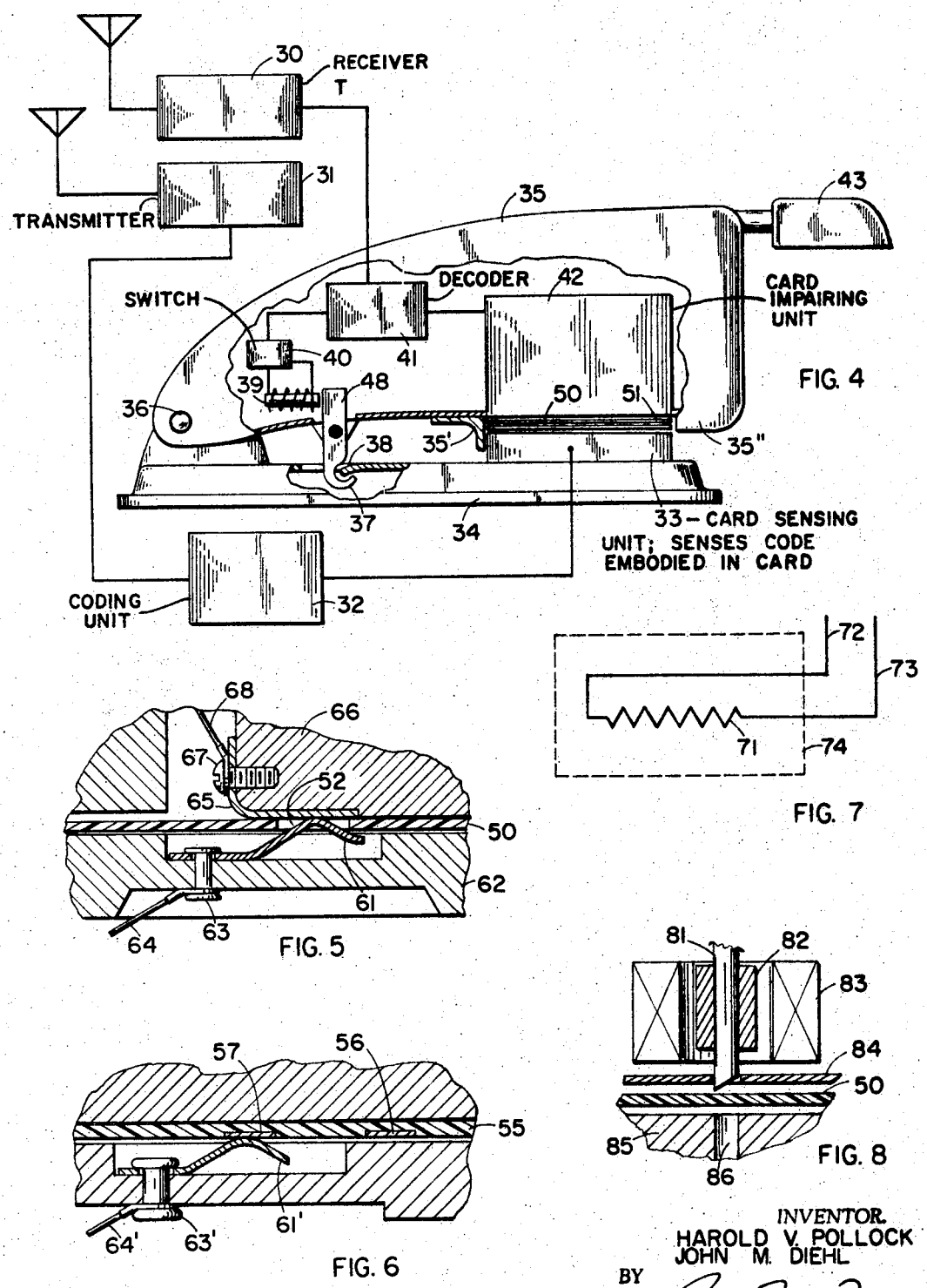

United States Patent Office 3,353,006
Patented Nov. 14, 1967

3,353,006
METHOD AND DEVICE FOR DESTROYING CREDIT CARDS
Harold V. Pollock, 1422 W. 28th St., Minneapolis, Minn. 55405, and John M. Diehl, Madison, Wis.; said Diehl assignor to said Pollock
Filed June 11, 1963, Ser. No. 287,119
2 Claims. (Cl. 235—61.7)

ABSTRACT OF THE DISCLOSURE

The invention relates to means to be utilized in conjunction with credit cards, said means comprising a central station and a plurality of outlying stations. A device at each of the outlying stations receives a credit card. When the device is closed by an operator, suitable means within the device senses a code embodied in the credit card. Information corresponding to this code is transmitted to the central station by a transmitter. At the central station this information is compared with information in a memory to determine whether the card is valid or whether its value should be reduced. Means are provided to transmit said information from the central station to each outlying station to indicate whether or not the card is valid. Means provided in conjunction with the device at the outlying station may act in response to this information to cause the usefulness of the credit card to be impaired, for example, by heating the card, by cutting it into pieces, by punching holes in it, by punching notches or by chemically defacing it, heating means being preferred. Means is provided to unlock the card from the machine without impairment of its usefulness if the value of the card is not to be reduced and only after its usefulness is impaired if it's to be reduced.

---

This invention relates to a device and method for canceling credit cards by destroying such cards, and more particularly to a method and means for destroying those cards which are delinquent, lost or stolen when the cards are presented for credit.

Many companies issue credit cards to persons to whom they wish to grant credit. The owners of such cards may present them to retailers such as gas stations, restaurants, department stores, hotels and the like in payment of their bills to such retailers. Credit card issuing companies guarantee payment to the retailer and collect from the card holder. Credit card issuing companies often have difficulties in preventing misuse of the cards by persons who are not entitled to use them. Such use may or may not be fraudulent. In order to prevent such misuses, cards are conventionally issued only for limited periods of time. At the end of such time, often six months or a year, the previously issued cards become void and new cards are issued to those who have not become delinquent in their accounts and who are otherwise believed by the company to be entitled to further credit. Several companies have as many as 1,000,000 or more card holders. The cost of issuing new cards periodically is very great. Cards which are lost or stolen are often misused or used fraudulently by persons who find or steal them. Card issuing companies spend considerable sums to detect and prevent such misuse or fraudulent use.

In accordance with the invention it is desired to provide a method and means whereby it is not necessary to issue cards which are valid only for a limited length of time, and whereby the card issuing company can cancel at will those cards which are lost or stolen or which are held by persons who are delinquent in their accounts, when the cards are presented to obtain credit. In accordance with this method and means, card issuing companies may avoid expenditure of the large sums previously mentioned.

Such cards are normally presented for credit (that is, to pay bills) at such retail establishments as heretofore mentioned. It is conventional for the card issuing companies to provide each of such retail establishments with a device into which a credit card can be inserted together with a sales slip or voucher. The device is provided with a ribbon and means to depress a platen to cause raised embossed indicia such as letters and/or numbers appearing on the credit card to act through the ribbon to imprint such embossed indicia on the sales slip or voucher.

An original and several copies of a sales slip or voucher may be interleaved with carbon manifold paper or an original and several copies of a sales slip or voucher may be provided in which all but the last copy are coated with carbon manifold composition on the underside. Such groups of manifolded sheets are referred to as carbon sets and may be used in place of a simple sales slip or voucher.

In accordance with the invention it is an object to provide method and means to cancel credit cards by destroying them when they are presented for payment wherein the means may be incorporated into a device of such type as now employed by retailers.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

FIGURE 4 is a schematic partially cross-sectional view of a device which may be utilized by a retailer to check on the validity of each card presented for credit and to destroy without further active participation on the part of either the retailer or the credit card holder those cards which are not valid;

FIGURE 5 is a cross-sectional fragmentary view of part of an apparatus to sense a code embodied in a credit card;

FIGURE 6 is a cross-sectional fragmentary view of another embodiment of means to sense the code embodied in a credit card;

FIGURE 7 is a schematic view of means to destroy a credit card;

FIGURE 8 is a cross-sectional schematic view of another embodiment of means to destroy a credit card.

Figure 1:
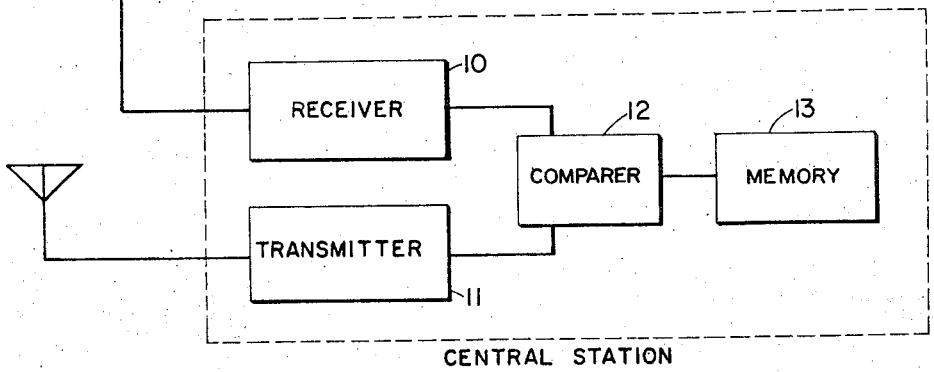
FIGURE 1 is a schematic view of one embodiment of a central station in accordance with the invention.

In accordance with a preferred embodiment of the invention, a machine of the type previously described which is provided with means to imprint on a sales slip or voucher or the like, embossed indicia appearing on a credit card, is also provided with means to sense a code embodied in the card and to transduce the sensed information into an electromagnetic signal and means to transmit the electromagnetic signal to a central station and with means to receive electro magnetic signals from a central station and wih means to decode said signals and with means to respond to said decoded signal to actuate a lock which may hold the machine closed and with means to destroy the credit card in response to a signal received from said central station. In accordance with the invention, there is further provided a central station located in an area in which a plurality of such machines are located, said machines preferably being located within relatively short distances, from said central station, such as from 10 to 50 miles.

The means associated with the machine which is held by the retailer, to send the signal to the central station, may be a radio transmitter and the means provided to receive the signal from the central station may be a radio receiver. In accordance with a preferred embodiment the central station may incorporate a mechanical or electronic memory of the type used conventionally in any one of the many conventional types of computers, a device to compare a received signal with information contained in the memory, a radio receiver to receive the signal from any outlying station and send it to the comparing device and a radio transmitter to receive the signal from the comparing device after it has ascertained the content of the memory device, and to transmit the signal to the outlying station, each device held by a retailer being herein referred to as an outlying station. Any number of outlying stations may be associated with a single central station, although it is generally preferred that at least about 20 outlying stations be associated with a central station. The method and means of the invention are particularly suitable for use in relatively populous areas in which credit cards are used a great deal.

In operation in accordance with the above preferred embodiments, a card is placed in the machine at the outlying station. It may be placed in the machine together with a voucher which may be a sales slip and may be a single copy or may be a carbon set. At the outlying station the machine is closed and a lock in the machine causes the machine to remain closed until a signal is received from the central station which opens the lock. If the card carries embossed indicia and is inserted together with a voucher, imprinting of the indicia on the voucher takes place when the machine is closed.

In accordance with the invention, the card contains a code which may be embodied in the card by:

punched holes,
embossed indicia,
indicia printed in magnetic ink,
circuits printed in conductive ink, or
so-called printed circuits which are provided in the card by etching away portions of a layer of conductive material.

Information contained in the code identifies the card holder and may contain such other information as desired by the card issuing company. The machine "reads" or senses the code embodied in the card and converts the sensed information into a suitable electromagnetic signal and broadcasts the signal to the central station where it is received by a receiver and compared with the information contained in the memory to determine the status of the card. In the simplest form only the codes corresponding to invalid cards are contained in the memory. If the comparing unit ascertains that the memory contains the code which corresponds to the card in the machine it may send forth a "no" signal, and if it does not find the number in the memory it may send forth a "yes" signal. The "yes" or "no" signal is broadcast by the radio transmitter at the central station and received by the receiver at the outlying station machine and fed into a transducer. If the signal is "no" the lock remains closed and the card destroying unit is actuated. The card destroying unit may be one which punches holes in the card or cuts the card in two, burns the card, dissolves the card, discolors the card, embrittles the card, softens the card, embosses the card or melts the card or shrinks the card. After the destroying unit has completed its operation and the card has been destroyed or so mutilated that it cannot be used further, the destroying unit ceases activation and the lock is opened.

Referring now to FIGURE 1, there is shown a schematic form of a central station which comprises a receiver 10 adapted to receive radio frequency signals, a transmitter 11 adapted to transmit radio frequency signals, a comparing unit 12 and a memory unit 13. The memory unit may be one which stores information on magnetic tape or magnetic discs or on a magnetic drum or one in which the information in the memory is stored in the form of punched cards or the like, the particular nature of the manner in which information is contained in the memory being no part of the invention. Usually the number of cards which need to be canceled at any one time is believed to be unlikely to exceed 40,000 for card issuing companies now existent in the United States and any one of several types of memory may be provided which can be scanned completely within 1 to 4 seconds. It is believed that all the information necessary to appear on a credit card can be embodied in a number containing 8 to 9 digits or in other words in less than 100 "bits" of information so that for 40,000 cards the memory would have to contain no more than 4,000,000 bits of information which could be scanned at the rate of 1,000,000 bits per second in 4 seconds. Any other system of information storage and data acquisition which may be suitable may be used; especially suitable may be a combination of code and memory wherein the code programs a search of only those parts of the memory which are pertinent to successive parts of the code.

Figure 2:
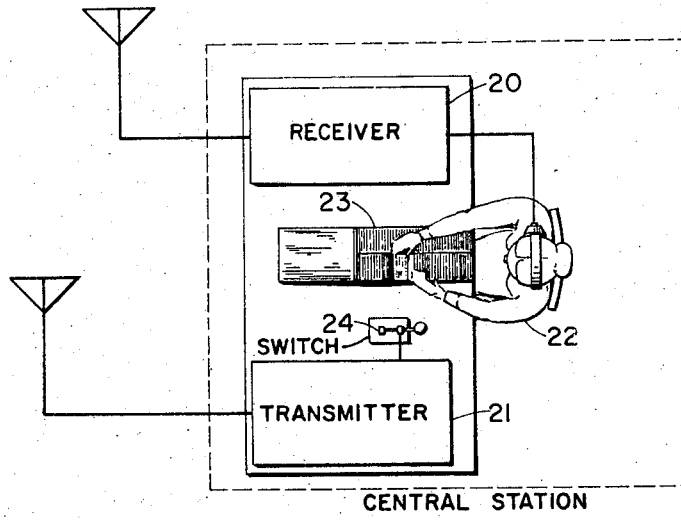
FIGURE 2 is a schematic view of another embodiment of such a central station.

There is shown in FIGURE 2 a central station which is particularly suitable if only a relatively small number of cards are usually invalid at a given time for a given card issuing company; the central station may consist essentially of a radio receiver 20, a radio transmitter 21, a set of file cards 23, and a human operator 22. Signals broadcast by the outlying station may be in a form comparable to Morse Code or International Code so that they are understandable to a human operator. The operator may receive the code audibly through earphones, may then search the card files and then may indicate the status of the card by operating switch 24, to send a signal corresponding either to "no" or "yes."

Figure 3:
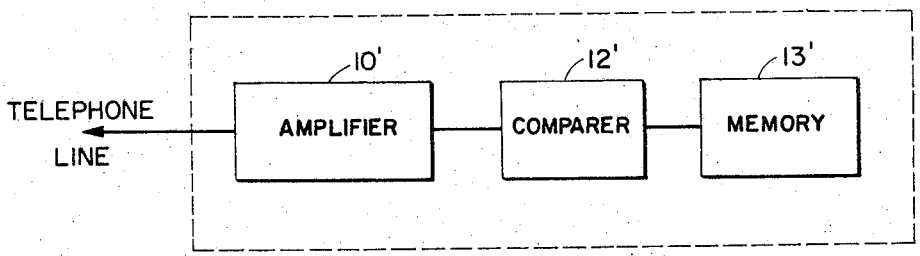
FIGURE 3 is a schematic view of another embodiment of such a central station.

As shown in FIGURE 3, it is not necessary that the transmission of the signal between the central station and each outlying station be by means of broadcast of radio frequency waves. It may instead be by means a private telephone line or a telephone line leased from a telephone utility company. Information may be transmitted from the outlying station to the central station and from the central station to the outlying station over a single line as shown. At the central station the incoming signal may be fed to an amplifier 10', then to a comparing unit 12' and to a memory unit 13 which may correspond to or be substantially identical to the comparing unit and memory unit of the embodiment of FIGURE 1.

The machine at the outlying station may comprise, as shown in FIGURE 4, a receiver 30 of radio frequency waves, a transmitter 31 of radio frequency waves, a coding unit 32, card sensing unit 33, a base 34, an upper portion 35 hingedly connected to the base at 36, card decoding unit 41, card destroying unit 42, and a movable latch 37 adapted to engage stationary latch member 38 attached to base 34, a latch operating means comprising armature 48 attached to latch member 37 and solenoid 39 and switch 40. Handle 43 may be provided attached to upper portion 35 to facilitate closing upper portion 35 against base 34. Projecting portions 35' and 35" may be adapted to enclose and surround card 50 which may be placed on top of card sensing unit 33 and may have sales slip or voucher 51 placed in overlying or underlying relationship with respect thereto.

A desired code may be embodied in the card in the form of holes punched therein, and if so the code may be sensed by the machine at the outlying station by any suitable means such as the conventional means shown in FIGURE 5, wherein card 50 may contain a plurality of punched holes 52, one of which is shown in FIGURE 5. In the machine at the outlying station there may be provided adjacent each portion of card 50 which contains a punched hole 52, an electrically conductive spring contact member 61 which may be attached to an insulating base 62 which may be of any suitable insulating material such as plastic, as shown, by any suitable means such as rivet 63 which may have attached thereto in conductive relationship a conductor 64 which may extend directly to coding unit 32 or may extend to a source of electric current. Contact member 61 may project through a hole 52 to contact an electrically conductive member 65, which may be attached to a portion 66 of the upper part of the machine by any suitable means such as screw 67 which may have attached thereto a conductor 68.

At each point at which a punched hole 52 exists in card 50, electrical contact is thus made between a corresponding member 61 and a corresponding member 65. At each point where there could be a hole but where there is no hole, no such contact is made. An electrical current may be passed through each pair of contact members at a point at which they are in contact and the current passed through the several such contacting pairs may be transmitted to a coding unit 32 which may convert them into a signal suitable for transmission to a central station.

In like fashion radio frequency signals received at the outlying section are detected and amplified by receiver 30 to provide a signal which when sent to decoder unit 41 is ascertained by unit 41 to be a signal indicating that the card either is to be or is not to be mutilated or destroyed. In the former case a signal is sent from unit 41 to unit 42 to operate unit 42 to cause the usefulness of the card to be impaired. In the latter case, unit 41 may cause a signal to be sent to switch 40 to cause latch 37 to be unlatched to make the card available. Furthermore, if unit 42 has operated, a signal may be directed from unit 42 to unit 41 and thence to switch 40 to cause latch 37 to be operated to allow the card to be removed from the device after its value has been reduced.

In accordance with another embodiment, as shown at FIGURE 6, card 55 may be of an orientable plastic material such as high density polyethylene, polypropylene or polyethylene terephthalate, said plastic being biaxially stretched, and card 55 may have embedded in one surface, as shown, conductive members such as members 56 and 57. Conductive members may be appliqued or printed on the surface rather than embedded in the surface. Contacting members 56 and 57 together with other conducting members embedded in the surface may provide circuits, not shown, so that when the circuits are contacted at various points by contact members such as spring contact member 61', information is obtained indicating the identity of the card holder and such other information as the credit card issuing company may desire. The information may be suitably transmitted to a coding unit wherein it may be converted into a signal suitable for transmission to a central station.

Although only two general types of coding of the cards are shown, being shown respectively in FIGURES 5 and 6, any other suitable method of incorporating information in the card may be used. Thus, the information may be incorporated in the card in the form of embossed portions of the card. These may actuate plunger members or spring members to open or close contacts corresponding to each embossed area or may be sensed in any other suitable manner. Alternatively, information may be embodied in the card in the form of numbers printed in magnetic ink as is now done widely with commercial bank checks and the information thus embodied in the card may be read in the same manner as such information obtained from such checks. The invention is not restricted to any particular mode of embodiment of information in the credit card. Means described below to destroy the card may be applied to either its partial or total destruction by applying the means to the entire card or alternatively only to a portion of the card. Where the impairment of the usefulness of a card is desired, this may be accomplished either by its total destruction or its partial destruction.

A simple and preferred means for destroying a credit card in a machine at an outlying station is shown in FIGURE 7, wherein there is shown schematically a heating unit consisting of a resistor 71 which is supplied with current through a circuit indicated by wires 72 and 73 and which may be contained in any suitable housing 74. The resistor may be of any suitable form. It need not be contained in a housing. It may be a coil of resistance wire or a resistance wire which is coiled into a helical coil and which coil is then coiled into a coil. It may, if desired, be embedded in insulating material.

If the card which is destroyed by the unit of FIGURE 7 is made of biaxially oriented plastics such as previously herein referred to, the function of the unit of FIGURE 7 may be to cause the card to shrink to such an extent that it is no longer usable. If the card is of a low melting plastic such as unoriented polyethylene or the like, the function of the unit of FIGURE 7 may be to cause the card to soften or even melt so that characters on it are no longer readable and so that it is clearly recognized by anyone to whom the card is presented that the card has been so multilated that it cannot be honored, and/or to so mutilate the card that the information and the code embodied therein can no longer be sensed or read. If the card is of a flammable plastic such as cellulose nitrate or of other flammable material such as paper, the action of the unit of FIGURE 7 may be to cause the card to burn; if so, the machine may be suitably designed so that the machine is undamaged by the very small fire which is created by the burning of the card. The card may be made of a material such as laminated paper and of various plastics so that application of heat by the unit of FIGURE 7 causes the card to become so brittle that it breaks into many pieces when removed from the machine, or to be reduced to a powder or to many small pieces while yet within the machine. There may be embodied within the card a pair of chemical reagents in well known manner so that application of heat thereto causes the chemicals to react and change in color whereby the color of the card is so changed that it is thenceforth recognized as being an invalid card or the color may be so darkened as to obliterate all information previously readable thereon, the identity of the card issuing company and the card holder thus being obliterated and the card made useless.

In accordance with FIGURE 8, one or more punch members 81 may be provided which may have armatures 82 attached thereto. A coil 83 may surround each of armatures 82 so that by passing a current through coil 83, armature 82 is actuated to cause punch 81 to travel downward through a guiding hole as shown in a bottom wall 84 of the upper portion of the machine, thence through card 50 and thence through a die; i.e., die member 85 having a hole 86 therein corresponding in internal dimensions to the external dimensions of punch member 81. In this manner the effectiveness of the card may be destroyed by utilizing punch member 81 to punch one or more holes or notches in the card. By providing a variation of the punch member 81 of FIGURE 8 in the form of a knife or guillotine, the card may be cut in two and by providing several such sets of knives or guillotines the card may be cut into numerous small pieces so that in either event it is no longer usable.

In a preferred form of application of the embodiment of FIGURE 8, a plurality of punch members 81 may be provided. The information in the signal issued by the central station, instead of merely being "yes" or "no," may be either "yes," indicating that the card is entirely valid, or may be any one of a number of additional signals indicating that the card is no longer valid for purchases of amounts exceeding any one of a number of different sums or can be used only for a limited additional length of time. The outlying machine and central station combination may be adapted to cause the central station to recognize and the outlying machine to indicate whether the card is being misused by reason of its presentation to obtain credit for a greater amount than that to which the card holder is entitled. For example, the outlying station may be provided with means to indicate to the central station the amount of credit for which the card is being presented and with a lamp or buzzer which may be operated upon receipt from the central station of a signal indicating that the desired amount of credit is excessive.

In still another embodiment, not shown, the machine at the outlying station may be provided with a reservoir of a chemical and with means to dispense the chemical onto the card. The composition of the card and the nature of the chemical may be such that application of the chemical thereto causes the card to become greatly discolored, thereby making it apparent that the card is not to be used any longer so that it will not be honored by any subsequent person to whom it is presented for credit.

Certain materials of construction have been described, of which the cards may be made. In addition to these the cards may be made of metal or may be made of a lamination of one or more layers of paper and one or more layers of metal or of one or more layers of paper and one or more layers of plastic or of one or more layers of metal and one or more layers of plastic or of one or more layers of each of metal, paper and plastic. Metals which may be utilized include copper, aluminum, brass, bronze, tin, silver and the like. Plastics include polymers, copolymers, terpolymers, and mixtures of polymers of any one or more of the following monomers: styrene and alkylstyrene, acrylic acid, methacrylic acid and lower alcohol esters of these acids, ethylene, propylene, isopropylene, butene, and isobutylene, acrylonitrile, vinyl chloride, vinyl acetate, vinylidene chloride, condensates of bisphenol and glycidyl ether, halogenated ethylene and propylene and many more.

In accordance with this invention, a credit card issuing company may obviate the need for periodically changing all of its cards in the hands of its credit card holders and may further obviate the need for tracking down criminals who steal cards and who use cards which have been lost by proper card holders merely by including information in the memories of various central stations which will cause such cards to be destroyed, that is, will cause the usefulness of the cards to be so impaired that they can no longer be used.

In using the embodiment of FIGURE 5, a sales slip or other voucher cannot be simultaneously printed while closing the machine and at the same time sensing the code contained in the card. Simultaneous imprinting and sensing of the code contained in the card can however be accomplished with the embodiment of FIGURE 6 and other embodiments which do not involve sensing members which pass through the card, merely by providing raised or otherwise embossed indicia on the surface of the card and introducing the sales slip or voucher or carbon set of sales slip original and copies or voucher original and copies into the machine on that side of the card which does contain the raised or embossed indicia; the code embodied in the card may be sensed by the machine from the other side of the card.

It is not necessary to the invention that the range of the central station be limited in extent. If desired, the central station might be provided with a broadcasting transmitter having sufficient power to reach outlying stations at a distance of 2,000 or 3,000 miles and each of the outlying stations might be provided with a transmitter sufficiently strong to send signals to the central station.

In accordance with another embodiment, the central station might be arranged to send out signals on wires which might, for example, be leased from a telephone company. At the end of each wire remote from the central station the signal might be broadcast by a radio frequency transmitter having only sufficient power to reach a limited area, say within a radius of 20 miles or 100 miles. However, by providing a suitable number of wires and a suitable number of such transmitting stations adapted to transmit signals originating in the central station, the system could be suitably adapted to cause a single signal from the central station to be received by all outlying stations within a wide radius. Thus, say a single central station in New York might be adapted to send signals which might be received by all outlying stations in the United States.

In yet another adaptation, signals sent from a single central station might be carried on wires to each outlying station even though the outlying stations are at a great distance from the central station.

It is not necessary to the invention that the card be destroyed, that is, entirely destroyed at the outlying station. It is sufficient to the purposes of the invention in some preferred embodiments that the card be only partially destroyed, that is, that its usefulness be impaired. Such impairment of usefulness of the card, which may be also referred to as partial destruction of the card, may be carried out in a number of ways. For example, the punching unit at the outlying station may introduce punch marks into the card which will serve to notify retailers or other persons to whom it is subsequently presented for credit that credit is to be limited to a certain amount. Such punch marks may also be adapted by suitable adaptation of the outlying stations and central station to inform the central station that the card may properly be presented only for a certain amount of credit.

The outlying station may further be modified to provide that the person operating the outlying station may inform the central station either by voice communication or code communication such as, for example, by punching suitable buttons on the outlying station machine that the card is being presented for a certain amount of credit. The comparing unit in the central station may then determine from the memory of the central station whether the card is being presented for excessive credit or not, and if it is being presented for excessive credit may cause a signal to be sent to the outlying station which will cause the outlying station to act to further partially destroy or impair the usefulness of the card to indicate that the card is so presented.

Each outlying station may be further modified to provide information to its users concerning whether the credit card is presented for an excessive amount of credit or whether the card has been lost or stolen. This information may be presented to the user of the outlying station by any suitable means which may be incorporated in the outlying station particularly, for example, by providing lamps in the outlying station which may be caused to be lighted by a signal from the central station. Such lamps may be of different colors. As another example a buzzer or other audible device may be provided in the outlying station and a signal from the central station may cause such buzzer or other audible device to operate to inform the user of whether the card is being presented for an excessive amount of credit or whether the card is lost or stolen.

In some cases suitable communication may be established between an outlying station and a local police station, such as by wire or wireless communication means provided between the outlying station and the local police station, to cause the local police station to be informed when a card is presented which has been stolen according to the records in the memory of the central station.

The impairment of the usefulness of the card, which may be either total destruction or partial destruction, has been described above as being accomplishable by providing suitable punching of the card, that is, by punching holes in the card or punching notches in the edge of the card or both. It may also be carried out by the partial application of any method hereinbefore above described for carrying out the total destruction of the card.

In a suitable embodiment an outlying station may be provided in a department store or other similar store at each selling counter at which sales are made and recorded and money is received or at which credit cards are normally received and the central station may be provided anywhere at any suitable place within the store or at any other suitable location which may be suitable for establishing communication either by wire or wireless means between the central station and the outlying stations.

Communication between central stations and outlying stations or between central stations and intermediate stations and between intermediate stations and outlying stations may be accomplished in the future by means of Laser beams and may utilize signal-carrying radiating beams sent to an earth satellite and reflected off from such a satellite, if passive, or rebroadcast by such satellite, if active, and thence transmitted to a receiving station on the earth.

Communication means between such stations may also utilize heretofore known devices wherein a person may write on a moving tape with a stylus or pen connected to two sensing solenoids, electromagnets or other devices to provide a signal which is transmitted either by wire or wireless means to another similar station where a pen is mounted to write upon a moving tape, the motion of the pen being controlled by two actuating means such as solenoids, electromagnets, or the like which are controlled by the signals received from the first device, such devices having been sold heretofore under the trademark "Telautograph."

It may thus be seen that the invention is broad in scope and includes such modifications as will be apparent to those skilled in the art and is to be limited only by the claims.

Having thus described our invention, we claim:

1. Means to ascertain the validity of a credit card when it is presented for payment and to select an alternative between permitting further use of said card without restriction and impairing further usefulness of said card and to then carry out the selected one of said alternatives, which comprises:
    a plurality of outlying stations,
    a central station, and
    at each of said outlying stations:
        a receiver for receiving signals transmitted from said central station,
        a transmitter for transmitting signals to said central station,
        a device to receive a credit card,
        latch means in said device to lock it closed to prevent removal of said credit card from the device,
        means in said device to imprint indicia from said credit card unto a form,
        a card sensing unit in said device to sense a code embodied in said card,
        a card impairing unit in said device to impair the usefulness of said card,
        switch means in said device to operate said latch means,
        a coding unit,
        a decoding unit,
        said coding unit being disposed to receive information from said card sensing unit corresponding to the code embodied in said card and to convert said information into a suitable electromagnetic signal suitable for transmittal of said information as modulation of radio frequency carrier waves, and
        means to introduce said signal from said coding unit to said transmitter,
        said decoding unit being adapted to receive a signal from said receiver, said signal carrying information indicating an alternative between the two actions: usefulness of the card is to be impaired and usefulness of the card is not to be impaired,
        said decoding unit adapted to introduce a signal corresponding to the first alternative to said card impairing unit to cause operation of said unit and to introduce a signal corresponding to the other alternative to said switch means to cause said device to be unlatched,
    said central station embodying:
        a receiver for receiving signals from said outlying stations,
        a transmitter,
        a comparer, and
        a memory,
        said memory containing sets of information each of which corresponds to information embodied as a code in each of a plurality of credit cards,
        said comparer being disposed to receive from the output of said receiver a signal carrying information corresponding to a code embodied in the credit card received in the device at the outlying station and to ascertain whether or not said information corresponds to one of the sets of information contained in said memory and to send to said transmitter a signal indicating one of the alternatives of: said information corresponds and said information does not correspond,
        the transmitter disposed to receive said signal from said comparer and to transmit to the receiver in an outlying unit a signal corresponding thereto.

2. The device of claim 1 wherein said card impairing unit contains means to heat said card.

References Cited

UNITED STATES PATENTS

| | | | |
|---|---|---|---|
| 3,039,582 | 6/1962 | Simjian | 194—4 |
| 3,061,192 | 10/1962 | Terzian | 235—157 |
| 3,184,714 | 5/1965 | Brown et al. | 340—149 |
| 3,262,124½ | 7/1966 | Albiani | 235—61.7 |

DARYL W. COOK, *Acting Primary Examiner.*

MAYNARD R. WILBUR, *Examiner.*

A. L. NEWMAN, J. SCHNEIDER, *Assistant Examiners.*